(12) United States Patent
Miyano (10) Patent No.: US 12,288,055 B2
(45) Date of Patent: Apr. 29, 2025

(54) INFORMATION PROCESSING DEVICE AND INFORMATION PROCESSING SYSTEM TO UPDATE A FUNCTION

(71) Applicant: SHARP KABUSHIKI KAISHA, Sakai (JP)

(72) Inventor: Yasuhiro Miyano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 145 days.

(21) Appl. No.: 18/126,319

(22) Filed: Mar. 24, 2023

(65) Prior Publication Data

US 2023/0325172 A1    Oct. 12, 2023

(30) Foreign Application Priority Data

Apr. 6, 2022  (JP) ................. 2022-063324

(51) Int. Cl.
| | | |
|---|---|---|
| G06F 9/445 | (2018.01) | |
| G06F 8/65 | (2018.01) | |
| G06F 9/44 | (2018.01) | |
| G06F 8/654 | (2018.01) | |

(52) U.S. Cl.
CPC .............. *G06F 8/65* (2013.01); *G06F 8/654* (2018.02)

(58) Field of Classification Search
CPC .................... G06F 8/65; G06F 8/654
See application file for complete search history.

(56) References Cited

U.S. PATENT DOCUMENTS

| | | | | |
|---|---|---|---|---|
| 2008/0263538 A1* | 10/2008 | Bando | ........... | G06F 8/65 717/171 |
| 2008/0263540 A1* | 10/2008 | Bando | ........... | G06F 8/658 717/173 |
| 2010/0138371 A1* | 6/2010 | Ishii | ........... | G06Q 10/10 709/219 |
| 2010/0199271 A1 | 8/2010 | Harada | | |
| 2012/0200891 A1* | 8/2012 | Tokumoto | ........... | G06K 15/00 358/1.15 |
| 2017/0364238 A1* | 12/2017 | Kim | ........... | G06F 16/275 |
| 2019/0095192 A1* | 3/2019 | Akita | ........... | G06F 3/1204 |

FOREIGN PATENT DOCUMENTS

| | | |
|---|---|---|
| JP | 2010176551 A | 8/2010 |
| JP | 2010198358 A | 9/2010 |

* cited by examiner

*Primary Examiner* — Anibal Rivera
(74) *Attorney, Agent, or Firm* — ScienBiziP, P.C.

(57) ABSTRACT

An electronic blackboard device that stores software of a plurality of functionalities includes: a touch panel that receives a user operation, a CPU that executes a piece of software of a functionality corresponding to the user operation, a usage history acquirer that acquires usage histories of the plurality of functionalities based on the execution of the piece of the software; an update information acquirer that acquires update information indicating update targets; a determiner that determines a functionality to be preferentially updated among the update targets based on the usage histories; and a display that provides an update notification to prompt update of the functionality thus determined.

5 Claims, 7 Drawing Sheets

INFORMATION PROCESSING DEVICE AND INFORMATION PROCESSING SYSTEM TO UPDATE A FUNCTION

INCORPORATION BY REFERENCE

The application claims priority based on 35 U.S.C. § 119 from Japanese Patent Application No. 2022-063324 filed on Apr. 6, 2022, the entire disclosure of which is incorporated herein.

BACKGROUND

The disclosure relates to an information processing device and an information processing system that notifies a user about presence of updated data of various functionalities (firmware) or equipped applications of an electronic appliance such as an information processing device. Hereinafter, firmware (FW) or an application is collectively referred to as "software". An application is also sometimes abbreviated to as "app".

A conventional art has been known to provide a program that notifies a user about an "update target functionality" to be affected by execution of an unapplied program for update, among a plurality of functionalities. This allows effectively prompting a user to update a program.

Another conventional art has been known to provide an electronic appliance that determines a timing to update software from usage frequency of a software module and information preset as a basic policy in update. This enables update of a software module at a timing that reflects a guideline of update intended by a user as much as possible.

SUMMARY

An information processing device according to the disclosure is an information processing device that stores software of a plurality of functionalities, the information processing device including: an operation receiver that receives a user operation to use the plurality of functionalities; an executor that executes a piece of the software of a functionality corresponding to the user operation among the plurality of functionalities; a usage history acquirer that acquires usage histories of the plurality of functionalities based on the execution of the piece of the software in the executor; an update information acquirer that acquires update information indicating update targets for the software of the plurality of functionalities; a determiner that determines at least one functionality to be preferentially updated among the update targets indicated by the update information based on the usage histories; and a notifier that provides an update notification to prompt update of a piece of the software of the at least one functionality thus determined.

An information processing system according to the disclosure includes an information processing device that stores software of a plurality of functionalities, and an update server that is communicated with and connected to the information processing device, wherein the information processing device includes: an operation receiver that receives a user operation to use the plurality of functionalities; an executor that executes a piece of the software of a functionality corresponding to the user operation among the plurality of functionalities; a usage history acquirer that acquires usage histories of the plurality of functionalities based on the execution of the piece of the software in the executor; an update information acquirer that acquires update information indicating update targets for the software of the plurality of functionalities; a determiner that determines at least one functionality to be preferentially updated among the update targets indicated by the update information based on the usage histories; and a notifier that provides an update notification to prompt update of a piece of the software of the at least one functionality thus determined, wherein the update server sends the update information to the information processing device.

DETAILED DESCRIPTION

Embodiments according to the disclosure will be described with reference to the drawings. The same or corresponding parts in the drawings are provided with the same reference character and no explanation repeated.

First Embodiment

Figure 1:
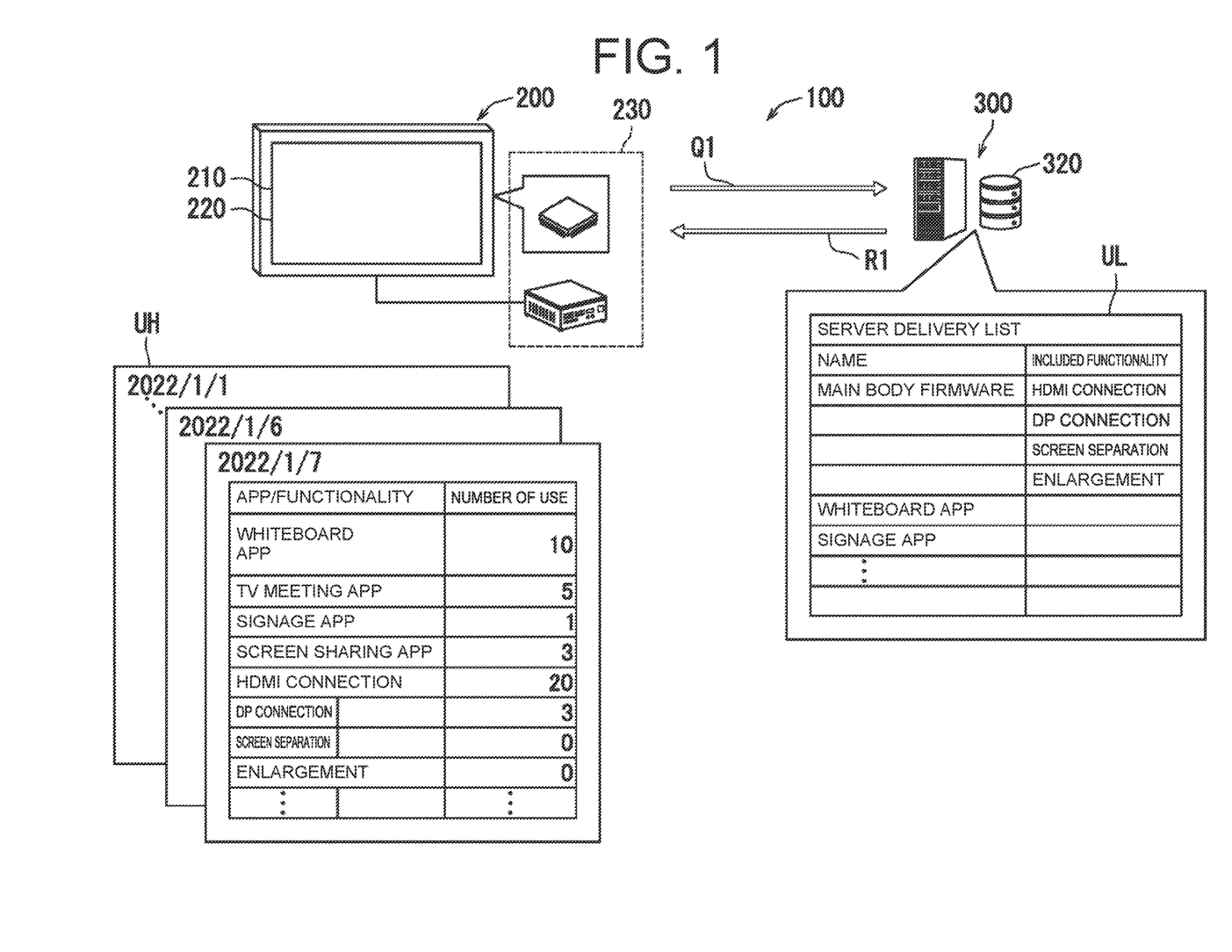
FIG. 1 is a schematic illustration of an information processing system 100 including an electronic blackboard device 200 and an update server 300 according to a first embodiment in the disclosure.
Figure 2:
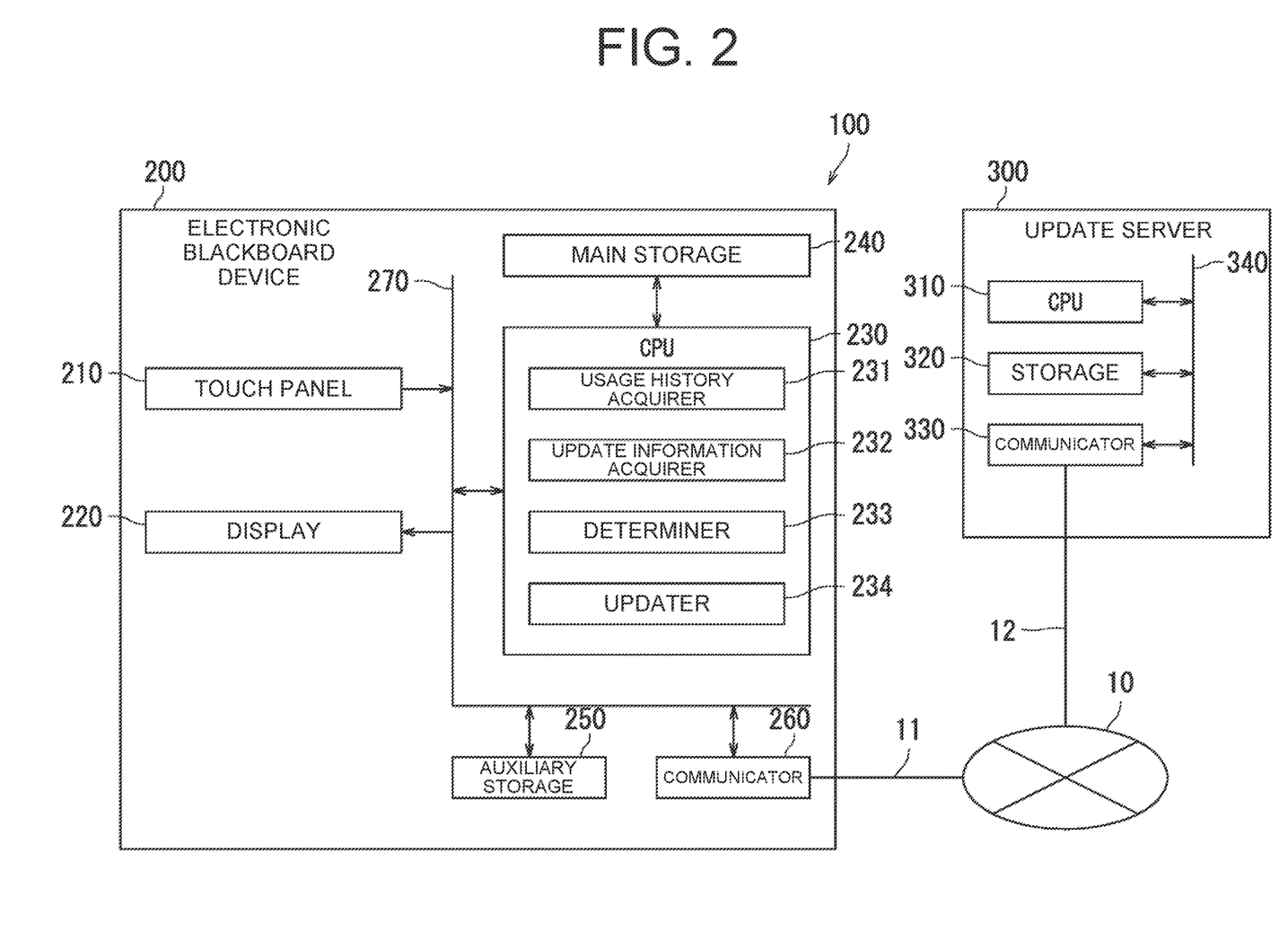
FIG. 2 is a circuit block diagram depicting a schematic configuration of the information processing system 100.

FIG. 1 is a schematic illustration of an information processing system 100 including an electronic blackboard (IWB: interactive whiteboard) device 200 and an update server 300 according to a first embodiment in the disclosure. FIG. 2 is a block diagram depicting a schematic configuration of the information processing system 100. The electronic blackboard device 200 is an example of an "information processing device" according to the disclosure.

The electronic blackboard device 200 is capable of activating a variety of applications, and achieves a functionality corresponding to the activated application. Examples of the application include, but are not limited to, in addition to a whiteboard app of a main functionality, a TV meeting app, a signage app, and a screen sharing app. Examples of firmware include, but are not limited to, HDMI (a registered trade mark; the same applies hereinafter) connection, DP connection, screen separation, and enlargement.

HDMI is an abbreviation for a high-definition multimedia interface. DP (display port) is a standard for video output interfaces designed for digital display devices.

1. 1 Schematic Configuration of Electronic Blackboard Device 200

As depicted in FIG. 1 and FIG. 2, the electronic blackboard device 200 includes a touch panel 210 and a display 220, which are integrated and large-sized, a CPU 230, a volatile main storage 240, a nonvolatile auxiliary storage 250, a communicator 260, and a data bus 270, which interconnects these components. Note that the CPU (central processing unit) 230 and the main storage 240 are directly connected in order to enable fast access. The CPU 230 further includes a usage history acquirer 231, an update information acquirer 232, a determiner 233, and an updater 234, and details thereof will be described later.

The touch panel 210 (corresponding to an "operation receiver" in the disclosure) receives a user operation that uses a plurality of functionalities. A touch panel sometimes also encompasses a displaying device or a display that projects an image or video in a broad sense, but herein means a position information input device or a touch detection device to detect a position with which a user's fingertip, a touch pen, or another tool contacts (touches).

Examples of a system for the touch panel 210 include, but are not limited to, a capacitance system, a resistance film system, an infrared protection system, and an ultrasonic surface acoustic wave system. Nevertheless, in view of achieving a multi-touch operation, a capacitance system or an infrared protection system are preferable. Moreover, not only a system of detecting a position directly contacted by a fingertip, a touch pen, or another tool, but also a contactless input system of detecting a position close to a fingertip or another tool (also referred to as "hover input" or "hover touch") may be employed.

The display 220 (corresponding to a "notifier" in the disclosure) provides an update notification to prompt update of a piece of software of at least one functionality determined to be preferentially updated. For example, an update target may be clearly specified, with a message to prompt update thereof being displayed.

Examples of the display 220 include, but are not limited to, a liquid crystal or an organic EL (organic electroluminescence). Most of liquid crystal displays to be used are of an in-cell type having wiring for a touch sensor between a glass substrate and a liquid crystal cell. By contrast, organic EL displays have a complex structure and thus less ease of employing an in-cell form, and therefore are mainly of external types or on-cell types.

The CPU 230 (corresponding to an "executor" in the disclosure) executes a piece of software of a functionality corresponding to a user operation among a plurality of functionalities. As depicted in FIG. 2, the CPU 230 improves in usability better than when built into the electronic blackboard device 200 by a built-in SoC (system-on-a-chip). In addition, an external personal computer is connected to use a CPU built in the personal computer.

Examples of the main storage 240 include, but are not limited to, a DRAM (dynamic random access memory).

Examples of the auxiliary storage 250 include, but are not limited to, a ROM (read only memory), a flash memory, and a hard disk. The auxiliary storage 250 stores software of a plurality of functionalities such as firmware or an application, in addition to an OS (operating system). The auxiliary storage device further stores software for achieving the disclosure, and details thereof will be described later.

The communicator 260 has hardware such as a communication interface, or software such as various communication protocols, for communicating with the update server 300 via the internet 10. The communication interface is not limited to a wired form that provides connection with the internet 10 by the cable 11, and may employ a wireless form.

1. 2 Schematic Configuration of Update Server 300

As depicted in FIG. 1 and FIG. 2, the update server 300 includes a CPU 310, a storage 320, a communicator 330, and a data bus 340 that intervenes data exchange among them. The storage 320 may be divided into a main storage and an auxiliary storage in a similar manner as the electronic blackboard device 200, so as to directly connect a main storage and the CPU 310. The configuration itself of the update server 300 is similar to that of a common computer, and thus further detailed explanation is omitted.

This update server 300 stores update information indicating update targets, as an updated data list UL into the storage 320, together with each updated data of software such as firmware or an application. As exemplarily depicted in FIG. 1, the updated data list UL lists functionalities included in update in the case of a main body firmware, or names thereof in the case of an application. Note that the updated data list UL is not limited to have such a form or content.

1. 3 Schematic Operation of Electronic Blackboard Device 200

Figure 3:
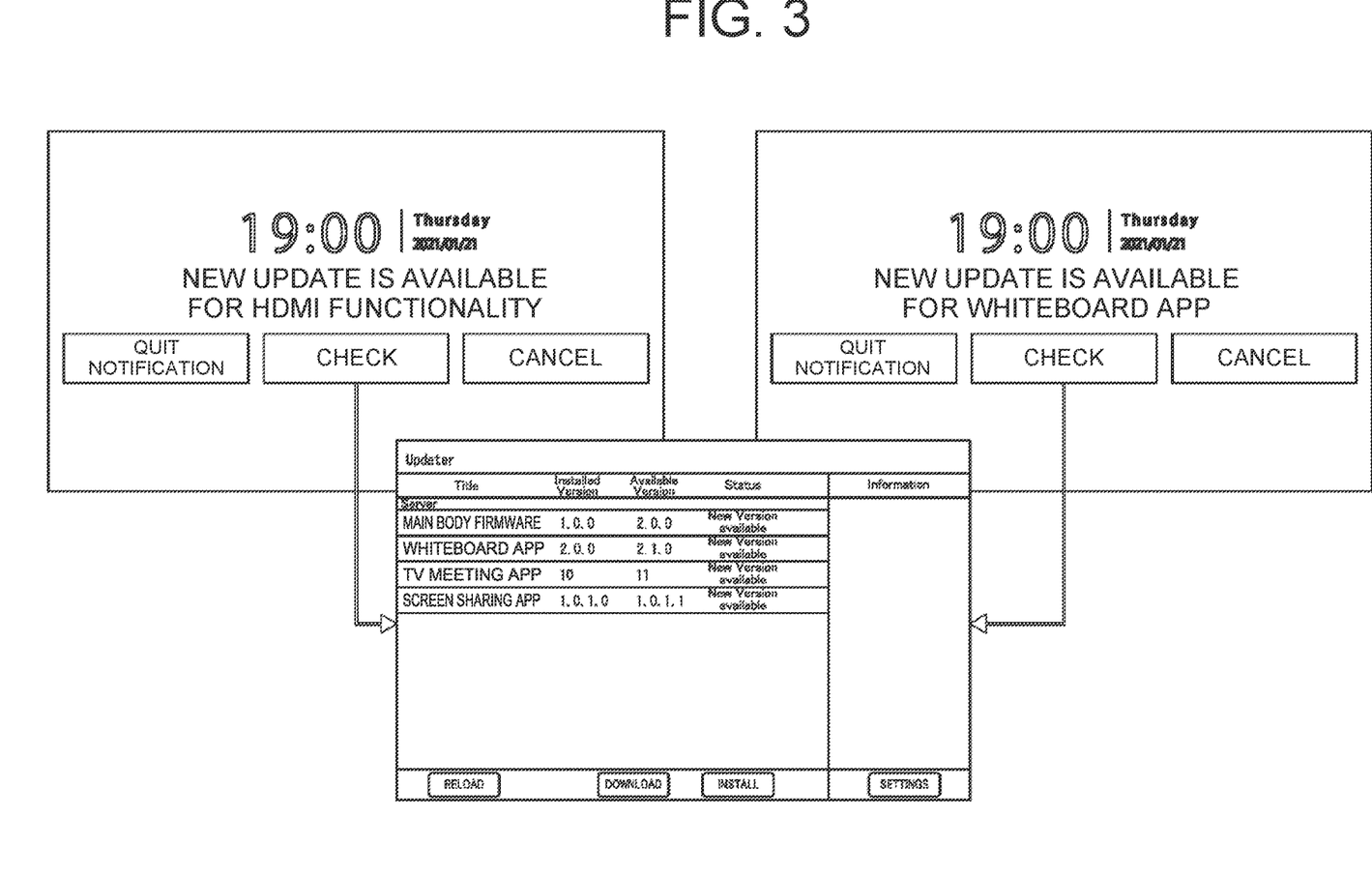
FIG. 3 is an illustration showing an exemplary notification to prompt each update of firmware and applications.

FIG. 3 is an illustration showing an exemplary notification to prompt each update of firmware and applications. Note that such indications would not be simultaneously made in one screen, and either one of the left view or the right view is displayed.

As described above, the auxiliary storage 250 also stores software for achieving the disclosure. The CPU 230 retrieves the software from the auxiliary storage 250, and executes each processing of the usage history acquirer 231, the update information acquirer 232, the determiner 233, and the updater 234.

First, the usage history acquirer 231 acquires usage histories of a plurality of functionalities based on execution of software such as firmware or an application at the CPU 230, and stores them into the auxiliary storage 250 as usage histories UH indicating usage frequencies.

The usage history UH refers to the number of use per day in the latest one week (corresponding to a "prescribed time period" in the disclosure) per a piece of software of various functionalities (firmware) or equipped applications as shown in FIG. 1, but is not limited to such a stored content. For example, a time period for storing the number of use may be changed, or a total time of use may be employed instead of the number of use, or the number of use and a total time of use may be stored together.

The update information acquirer 232 acquires update information indicating update targets for software of a plurality of functionalities. In particular, a query is first provided to the update server 300 whether update information indicating the update targets is present (Q1 in FIG. 1). If the update information is present, the updated data list UL is received as a response from the update server 300 (R1 in FIG. 1).

The determiner 233 determines at least one functionality to be preferentially updated among the update targets indicated by the update information, based on the usage histories UH of software stored in the auxiliary storage 250. In particular, with reference to the usage history UH, comparison with the updated data list UL proceeds in descending order of usage frequency, thereby determining a matching piece of software.

For a piece of software of at least one functionality determined to be preferentially updated in this manner, the display 220 provides an update notification for prompting update of the piece of software, as described above.

For example, when a usage frequency of HDMI connection is high, a message (corresponding to a "notification image" in the disclosure) may be displayed to prompt update of a main body firmware (HDMI connection functionality), as depicted on the left in FIG. 3. Alternatively, when a usage frequency of a whiteboard app is high, a message may be displayed to prompt update of the whiteboard app, as depicted on the right in FIG. 3.

The touch panel 210 receives a user's instruction operation to instruct update of the piece of software prompted in the update notification on the display 220. When an update notification as shown in FIG. 3 is provided, an instruction operation can be "quit notification", "check", or "cancel". Another instruction operation may also be available by the update notification.

If the instruction operation is "quit notification", update of the piece of software prompted in the update notification is quit, and no subsequent similar update notification is to be provided.

If the instruction operation is "cancel", update of the piece of software prompted in the update notification is quit at this time, but a subsequent update notification is provided in a similar manner; this is a different point from the previous item.

If the instruction operation is "check", details information of contents of update of the piece of software prompted in the update notification is displayed with overlapping the update notification, as shown on the lower in FIG. 3.

The lower part of the display of the detailed information of the update contents includes an arrangement of respective buttons for "RELOAD", "DOWNLOAD", "INSTALL", and "SETTINGS"; once any button is touched, the updater 234 executes a corresponding process. For example, once a "INSTALL" button is touched, the updater 234 executes an update process of the piece of software indicated in the update notification.

1. 4 Usage Frequency Recording Processing and Update Notification Processing of Electronic Blackboard Device 200

Figure 4:
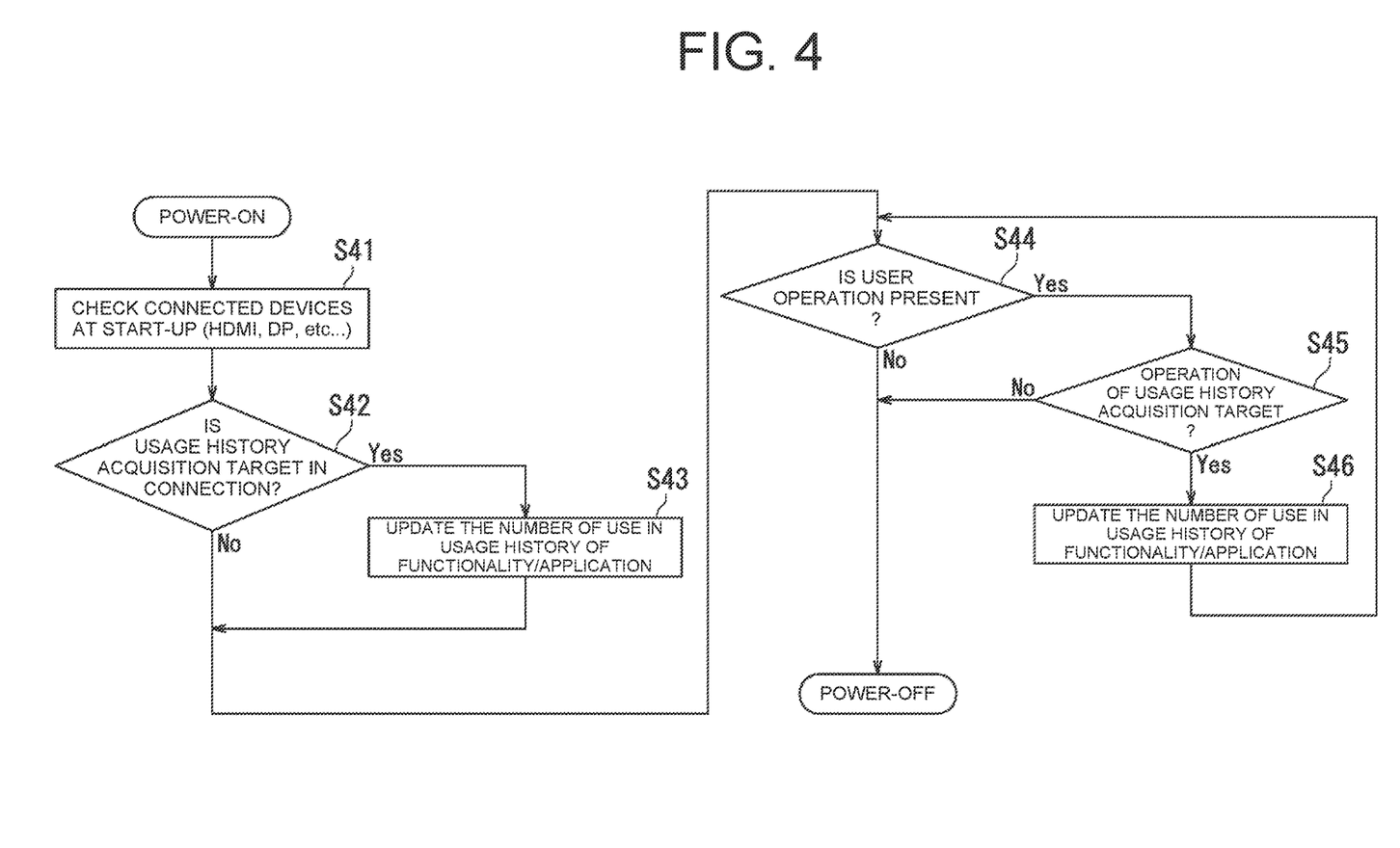
FIG. 4 is a flowchart exemplifying a usage frequency recording processing by the electronic blackboard device 200.

FIG. 4 is a flowchart exemplifying a usage frequency recording processing by the electronic blackboard device 200.

As shown in FIG. 4, upon power-on, the CPU 230 checks a connected appliance at start-up at step S41. Examples of the connected appliance include, but are not limited to, a variety of electronic appliances by HDMI connection, DP connection, or another connection.

Next, at step S42, connection of a usage history acquisition target is checked; if Yes, the processing performs a process of step S43 and then proceeds to step S44, and if No, the processing directly proceeds to step S44.

At step S43, the number of use of various functionalities (firmware) in a current day in the usage history UH (see FIG. 1) stored in the auxiliary storage 250 is updated. For example, in use of HDMI connection, a numerical value in a corresponding field for the number of use is increased by 1.

At step S44, presence of a user operation against the touch panel 210 is checked; if Yes, the processing proceeds to step S45.

At step S45, whether the user operation is an operation of a usage history acquisition target is checked; if Yes, the processing performs a process of step S46 and then returns to step S44.

At step S46, the number of use of an equipped application in a current day in the usage history UH (see FIG. 1) stored in the auxiliary storage 250 is updated. For example, for a user operation in a whiteboard app, a numerical value in a corresponding field for the number of use is increased by 1.

As described so far, processes of step S44-S46 are repeated as long as a user operation of a usage history acquisition target is present. Once such a user operation is absent, a power source of the electronic blackboard device 200 is turned off e.g., after a lapse of a prescribed time period.

Figure 5:
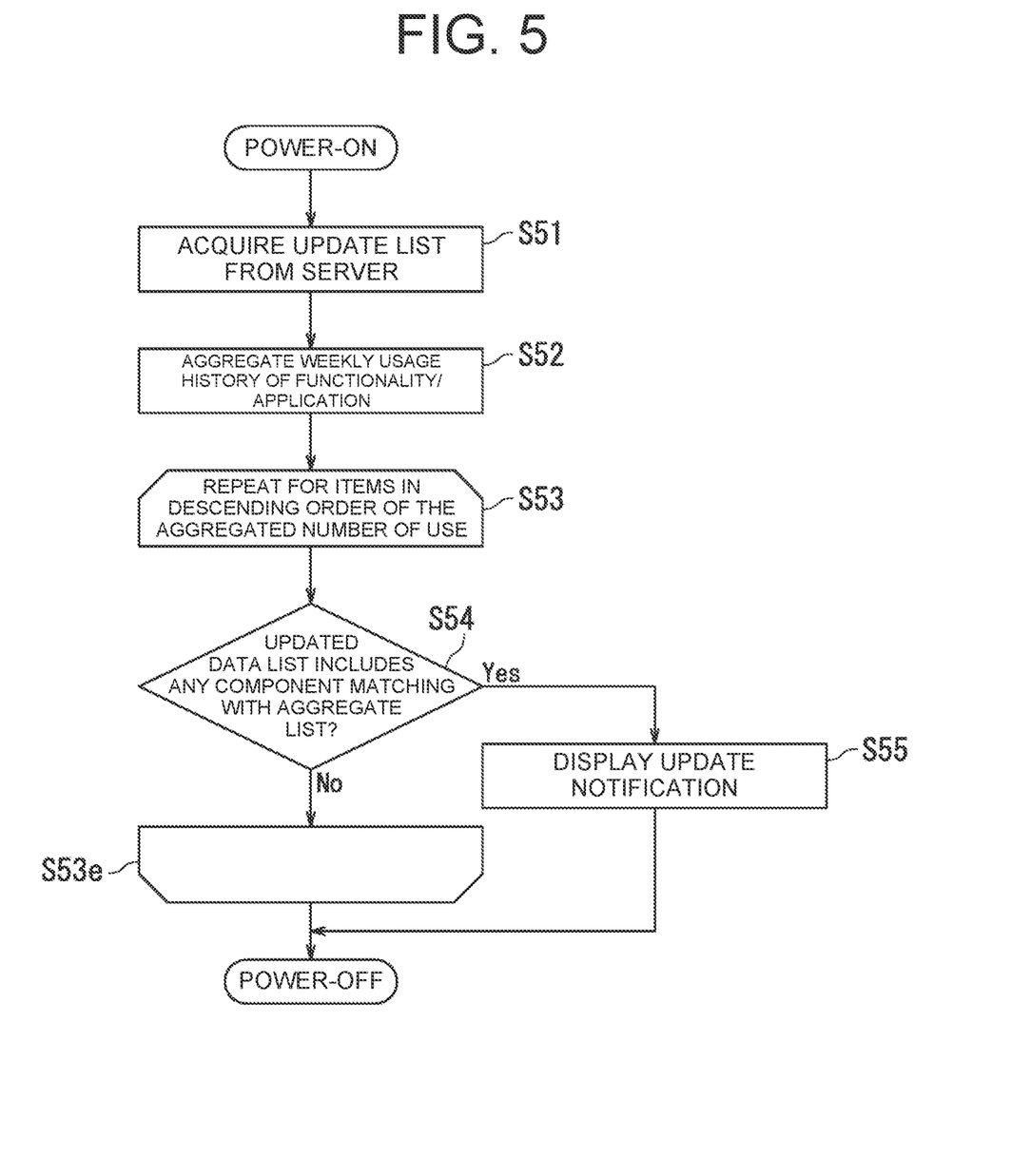
FIG. 5 is a flowchart exemplifying an update notification processing by the electronic blackboard device 200.

FIG. 5 is a flowchart exemplifying an update notification processing by the electronic blackboard device 200.

As shown in FIG. 5, upon power-on, the CPU 230 causes the update information acquirer 232 to acquire the updated data list UL from the update server 300 at step S51.

At step S52, the determiner 233 is made to refer to the usage history UH, and creates an aggregate list where the number of use for a week is aggregated for each piece of software of various functionalities (firmware) or equipped applications and aligned as a list in a descending order.

In a loop of steps S53-S53e, a process of step S54 is repeated for pieces of software in a descending order of the usage frequency thus aggregated, i.e., in a descending order of the aggregated number of use for a week.

At step S54, whether the updated data list UL includes any component matching with the aggregate list created at step S52 is determined; if Yes, the processing proceeds to step S55, and if No, the processing returns to step S53.

At step S55, an update notification of a piece of software having a match between the aggregate list and the updated data list UL is displayed on the display 220 (see FIG. 3), and then the loop of steps S53-S53e is finished.

As described so far, in the first embodiment according to the disclosure, the electronic blackboard device 200 (the auxiliary storage 250 therein) carries the usage history UH indicating usage frequency of software. Moreover, the electronic blackboard device 200 also serves as a main body to provide an update notification.

Second Embodiment

In a second embodiment according to the disclosure, the usage history UH created by the electronic blackboard device 200 is also sent to the update server 300. The update server 300 also serves as a main body to create an update notification. These are main points of difference from the first embodiment. Hereinafter, the same configuration as in the first embodiment is provided with the same reference character, and description will be made mainly for difference.

2. 1 Schematic Configuration of Information Processing System 100

Figure 6:
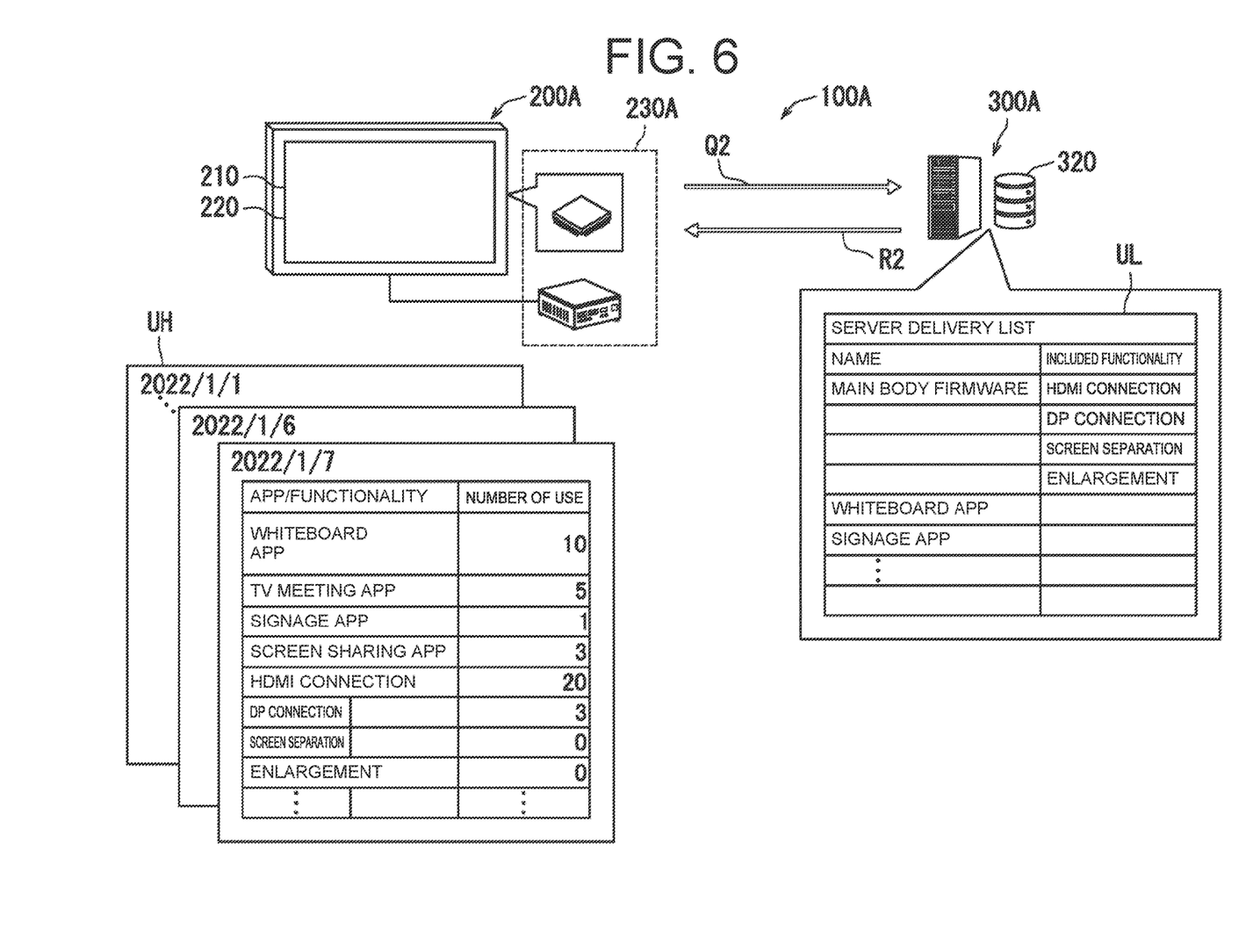
FIG. 6 is a schematic illustration of an information processing system 100A including an electronic blackboard device 200A and an update server 300A according to a second embodiment in the disclosure.

FIG. 6 is a schematic illustration of an information processing system 100A including an electronic blackboard device 200A and an update server 300A according to a second embodiment in the disclosure. The hardware configuration of the whole of the electronic blackboard device 200A may be the same as that of the electronic blackboard device 200 in the first embodiment. The hardware configuration of the whole of the update server 300A may also be the same as that of the update server 300 in the first embodiment.

As depicted in FIG. 6, the electronic blackboard device 200A differs from the device in the first embodiment, solely in including a CPU 230A instead of the CPU 230 in first embodiment. That is because in spite of the hardware configuration of the CPU 230A being the same as that of the CPU 230, at least the update information acquirer 232 in the first embodiment is not required. Instead, software for executing the following two processes is required:

sending the usage history UH to the update server 300 (Q2), and receiving an update notification from the update server 300 (R2).

2.2 Schematic Operation of Information Processing System 100A

Figure 7:
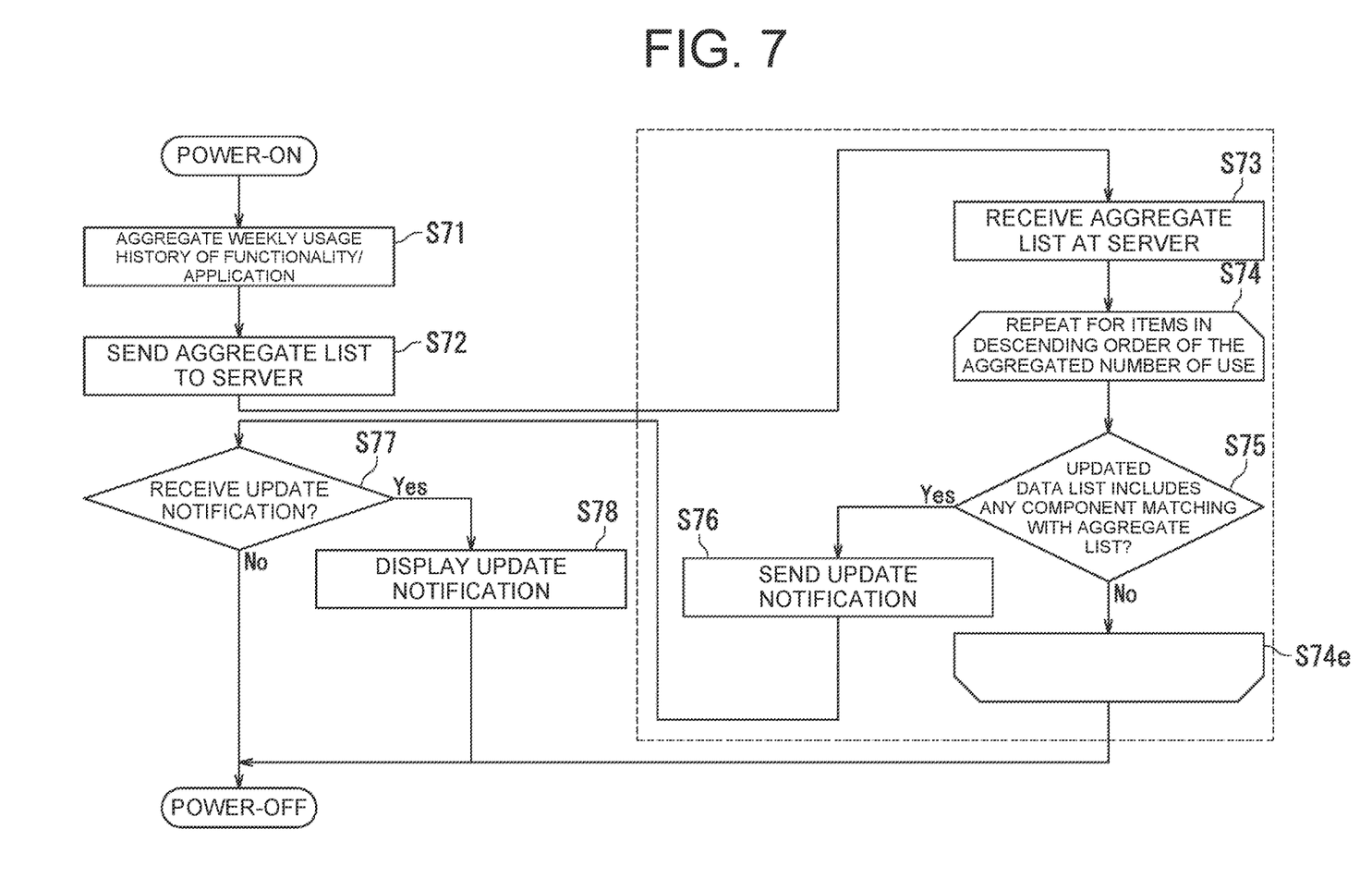
FIG. 7 is a flowchart exemplifying an update notification processing by an update server 300A.

FIG. 7 is a flowchart exemplifying an update notification processing by an update server 300A. In this figure, each step in a dotted rectangle is executed on the update server 300A, and each of the other steps is executed on the electronic blackboard device 200A.

As shown in FIG. 7, upon power-on, the CPU 230A refers to the usage history UH, and creates an aggregate list where the number of use for a week is aggregated for each piece of software and aligned as a list in a descending order, at step S71, in a similar manner to step S52 in FIG. 5.

At step S72, the CPU 230A sends the aggregate list to the update server 300A.

Then, the update server 300A receives the aggregate list at step S73 corresponding to step S72.

In a loop of steps S74-S74e, a process of step S575 is repeated in a descending order of the aggregated usage frequency in a similar manner to the loop of steps S53-S53e in FIG. 5.

At step S75, whether the updated data list UL includes any component matching with the aggregate list received at step S73 is checked; if Yes, the processing proceeds to step S76, and if No, the processing returns to step S74.

At step S76, an update notification of a piece of software having a match between the aggregate list and the updated data list UL is sent to the electronic blackboard device 200A, and then the loop of steps S74-S74e is finished.

Then, the electronic blackboard device 200A determines whether the update notification is received at step S77 corresponding to step S76; if Yes, the processing proceeds to step S78, and if No, the processing directly finishes.

At step S78, an update notification of a piece of software having a match between the aggregate list and the updated data list UL is displayed on the display 220 (see FIG. 3).

According to the disclosure described above, a notification indicates that updated data including update of a piece of software having a high usage frequency is applicable, thereby allowing drawing an attention of a user and positively prompting application of updated data.

With reference to the drawings, embodiments according to the disclosure have been described so far. However, the disclosure is not limited to the aforementioned embodiments, and can be implemented in various aspects without departing from the spirit. Moreover, a plurality of components disclosed in the aforementioned embodiments can be combined, thereby embodying a variety of disclosure. For example, some components may be deleted from the total components illustrated in the embodiments. The drawings schematically depict mainly each component for ease of understanding, and the number of each of the depicted components may be different from the real owing to convenience of creation of the drawings. Furthermore, each component illustrated in the aforementioned embodiments is an example, and is not particularly limited, and various modification is available without substantially departing from an effect of the disclosure.

The invention claimed is:

1. An information processing device that stores software of a plurality of functionalities, the information processing device comprising:
    at least one central processing unit (CPU) configured to:
        receive a user operation to use the software;
        execute a piece of the software associated with a functionality, among the plurality of functionalities, corresponding to the user operation;
        acquire usage histories of the plurality of functionalities based on the execution of the piece of the software;
        acquire update information indicating update targets for the software;
        determine at least one functionality to be preferentially updated among the update targets indicated by the update information based on the usage histories,
        provide an update notification to prompt an update of a piece of the software associated with the at least one functionality based on the determination, wherein:
        the acquired usage histories of the plurality of functionalities are associated with a time period that ends at a point of time of the acquisition of the update information and starts from a prescribed time period before the acquisition of the update information, and
        the functionality has a longer total time of use in the prescribed time period than the at least one functionality.

2. The information processing device according to claim 1, wherein the at least one CPU is further configured to:
    receive an instruction operation instructing to update the piece of the software associated with the at least one functionality prompted in the update notification, and
    execute the update of the piece of the software associated with the at least one functionality instructed by the instruction operation.

3. The information processing device according to claim 1, further comprising a display displaying an image,
    wherein providing the update notification comprises displaying, on the display, a notification image that prompts the update of the piece of the software associated with the at least one functionality.

4. The information processing device according to claim 3,
    wherein the at least one CPU is further configured to determine an order of priority for updating the update targets in a descending order of the total time of use of a corresponding functionality in the plurality functionalities that is associated with each update target in the update targets during the prescribed time period, and
    wherein the notification image includes an update list indicating functionalities of the update targets according to the determined order of priority.

5. An information processing system comprising:
    an information processing device that stores software of a plurality of functionalities; and
    an update server that communicates with and is connected to the information processing device,
    wherein the information processing device includes:
        at least one central processing unit (CPU) configured to:
            receive a user operation to use the software;
            execute a piece of the software associated with a functionality, among the plurality of functionalities, corresponding to the user operation;
            acquires acquire usage histories of the plurality of functionalities based on the execution of the piece of the software;
            acquire update information indicating update targets for the software;
            determine at least one functionality to be preferentially updated among the update targets indicated by the update information based on the usage histories,
            provide an update notification to prompt an update of a piece of the software associated with the at least one functionality based on the determination, send the update information to the information processing device, wherein:

the acquired usage histories of the plurality of functionalities are associated with a time period that ends at a point of time of the acquisition of the update information and starts from a prescribed time period before the acquisition of the update information, and the functionality has a longer time of use in the prescribed time period than the at least one functionality.

* * * * *